US007593387B2

(12) United States Patent
Leviton et al.

(10) Patent No.: US 7,593,387 B2
(45) Date of Patent: Sep. 22, 2009

(54) VOICE COMMUNICATION WITH SIMULATED SPEECH DATA

(75) Inventors: Dan'l Leviton, Corona, CA (US); Henri Isenberg, Los Angeles, CA (US)

(73) Assignee: Symantec Corporation, Cupertino, CA (US)

( * ) Notice: Subject to any disclaimer, the term of this patent is extended or adjusted under 35 U.S.C. 154(b) by 1137 days.

(21) Appl. No.: 10/215,835

(22) Filed: Aug. 8, 2002

(65) Prior Publication Data

US 2002/0193993 A1 Dec. 19, 2002

Related U.S. Application Data

(62) Division of application No. 09/165,020, filed on Sep. 30, 1998, now Pat. No. 6,501,751.

(51) Int. Cl.
*H04L 12/66* (2006.01)
*H04M 1/64* (2006.01)
*G10L 19/00* (2006.01)

(52) U.S. Cl. ..................... 370/352; 379/88.07; 704/201

(58) Field of Classification Search ................. 370/352, 370/400, 412; 704/1, 200, 246, 251, 277, 704/231, 258, 9, 260, 270, 88.13; 379/88.07, 379/88.13
See application file for complete search history.

(56) References Cited

U.S. PATENT DOCUMENTS

| | | | | |
|---|---|---|---|---|
| 5,347,305 | A | 9/1994 | Bush et al. | |
| 5,548,647 | A * | 8/1996 | Naik et al. | 704/200 |
| 5,867,816 | A * | 2/1999 | Nussbaum | 704/232 |
| 5,960,399 | A * | 9/1999 | Barclay et al. | 704/270.1 |
| 6,088,803 | A | 7/2000 | Tso et al. | |
| 6,212,498 | B1 | 4/2001 | Sherwood et al. | |
| 6,224,636 | B1 | 5/2001 | Wegmann et al. | |
| 6,226,361 | B1 * | 5/2001 | Koyama | 379/88.07 |
| 6,240,392 | B1 | 5/2001 | Butnaru et al. | |
| 6,253,174 | B1 | 6/2001 | Ishii et al. | |

(Continued)

FOREIGN PATENT DOCUMENTS

EP 0 776 097 A2 5/1997

OTHER PUBLICATIONS

Parkhouse, Jayne, "Pelican SafeTNet 2.0" [online], Jun. 2000, SC Magazine Product Review, [retrieved on Dec. 1, 2003]. Retrieved from the Internet: <URL: http://www.scmagazine.com/scmagazine/standalone/pelican/sc_pelican.html.

(Continued)

*Primary Examiner*—Hanh Nguyen
(74) *Attorney, Agent, or Firm*—Fenwick & West LLP

(57) ABSTRACT

Voice conversations by way of communications devices are conducted by transmitting symbols representative of a user's voice from a transmitting communications device and recreating the user's voice at a receiving communications device. The communications devices each include a processing engine responsive to a user's voice input for generating speech sample data indicative of predetermined portions of the user's voice. A storage device is coupled to the processing engine and stores the speech sample data. The processing engine also includes a communication module that generates transmission data, indicative of the user's voice spoken during a communication session as a function of the speech sample data and causes transmission of the transmission data to a remotely located recipient of the communication session.

27 Claims, 6 Drawing Sheets

U.S. PATENT DOCUMENTS 6,288,739 B1 9/2001 Hales et al.

OTHER PUBLICATIONS

"IBM Tools Accelerate Development of Speech-Enabled Software Applications", IBM Corporation, May 14, 1998, pp. 1-4, Somers, NY, USA.

"IBM Speech Systems", Executive Conference, IBM Corporation, May 14, 1998, Palm Springs, CA, USA.

Felici, M, Borgatti, M. Guerrieri, R., "Very low bit rate speech coding using a diphone-based recognition and synthesis approach", *Electronics Letters*, Apr. 30, 1998, pp 859-860, vol. 34, No. 9.

Maeran, O., Piuri, V, Storti Gajani, G., "Speech Recognition Through Phoneme Segmentation and Neural Classification", IEEE Instrumentation and Measurement Technology Conference, May 19-21, 1997, pp. 1215-1220, Ottawa, Canada.

"Full/Adaptive Phoneme Speech Data Compression", IBM Technical Disclosure Bulletin, Aug. 1997, p. 79, vol. 40, No. 08, IBM Corporation, USA.

* cited by examiner

VOICE COMMUNICATION WITH SIMULATED SPEECH DATA

RELATED APPLICATION

This application is a divisional of U.S. patent application Ser. No. 09/165,020 filed Sep. 30, 1998 now U.S. Pat. No. 6,501,751.

TECHNICAL FIELD

This invention relates generally to the field of voice communications and more particularly to compression or reduction of data required for voice communications.

BACKGROUND ART

Voice communication is typically conducted over the Public Switched Telephone Network (PSTN), in which a virtual dedicated circuit is established for each call. In such a circuit, a real-time connection is established that allows two-way transmission of data during the telephone call. Data communication can also be performed on such virtual circuits. However, data communication is increasingly being performed on wide-area data networks, such as the Internet, which provide a widely available and low-cost shared communications medium. Voice communications over such data networks is possible and is attractive because of the potentially lower cost of communicating over data networks, and the simplicity and lower cost of performing data and voice communications over a single network. However, the real-time nature of voice communications, coupled with the bandwidth required for such communication, often makes use of data networks for voice communication impractical. The bandwidth required for conventional voice communication also limits the use of services such as video conferencing which require significant additional amounts of bandwidth.

Accordingly, there is a need for techniques that reduce the amount of transmitted data required for voice communications.

DISCLOSURE OF INVENTION

In a principal aspect, the present invention reduces the amount of data required to be transmitted for voice communication. In accordance with a first object of the invention, voice data is transmitted by generating, in response to voice inputs (110) from a user, speech sample data (112) indicative of a sample of the user's voice. During a communication session, voice transmission data is generated as a function of the user's voice spoken during the communication session. The voice transmission data is then transmitted to a receiving station (101) designated in the communication session. The user's spoken voice is then recreated at the receiving station as a function of the speech sample data (112).

Transmission of voice data in such a manner greatly reduces the bandwidth required for voice communication. Voice communications over data networks therefore becomes more feasible because the reduced bandwidth helps to alleviate the latency often encountered in data networks. A further advantage is that the decreased bandwidth required by voice communications frees bandwidth for transmission of additional data, such as video data for video-conferencing.

These and other features and advantages of the present invention may be better understood by considering the following detailed description of a preferred embodiment of the invention. In the course of this description reference will be frequently made to the attached drawings.

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

Figure 1:
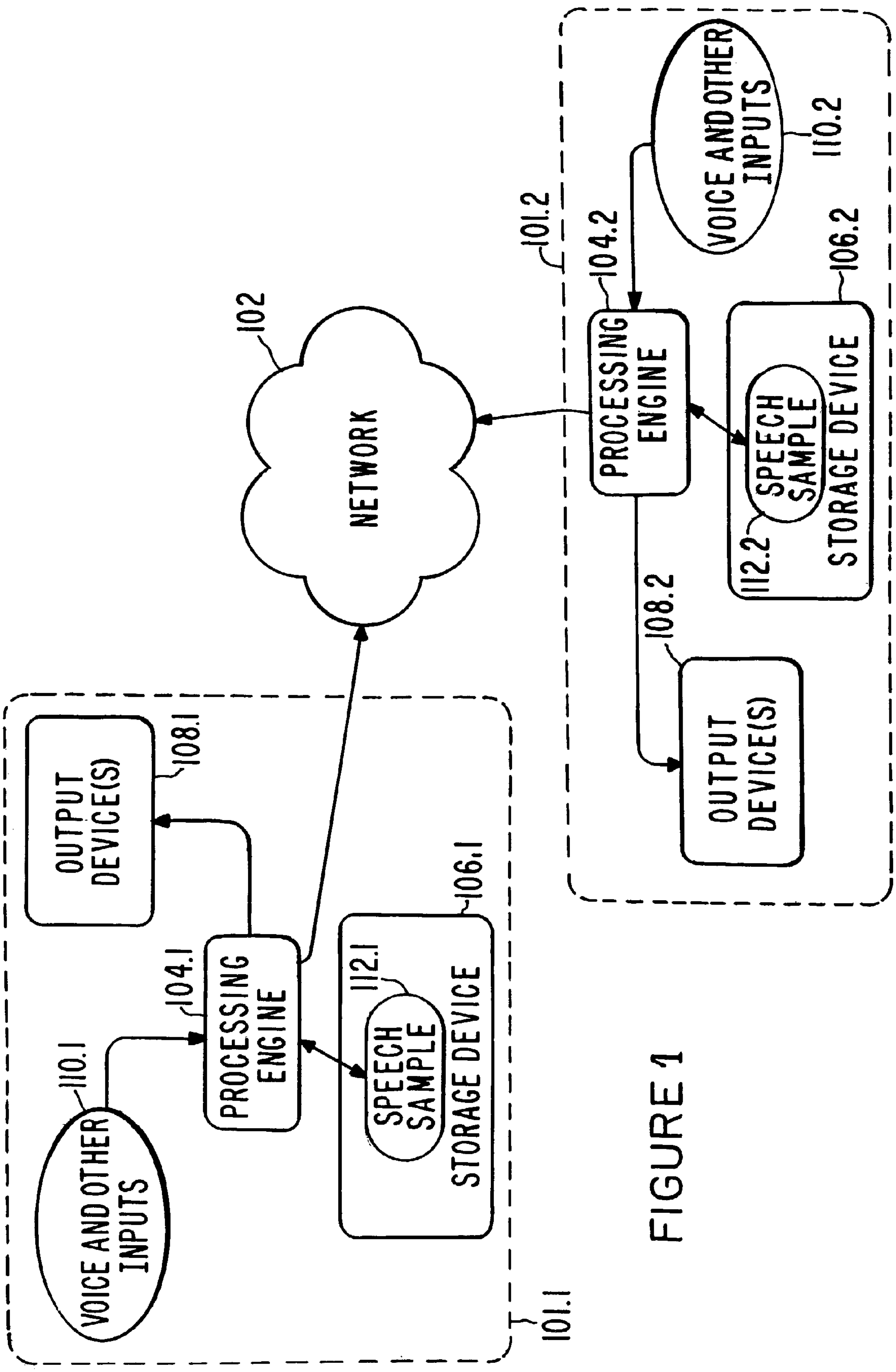
FIG. 1 is a block diagram of voice communication in accordance of the principles of the present invention.

In FIG. 1, communications devices 101.1 and 101.2 operate in accordance with the principles of the present invention to perform two-way voice communication across network 102. Communications devices 101.1 and 101.2 are shown in FIG. 1 as being the same type of device and are referred to herein collectively as "communications devices 101." The corresponding elements of communications devices 101 are also designated by numerical suffixes of 0.1 and 0.2 to designate correspondence with the appropriate communications device 101.1 or 101.2.

Network 102 can take a variety of forms. For example, network 102 can take the form of a publicly accessible wide area network, such as the Internet. Alternatively network 102 may take a form of a private data network such as is found within many organizations. Alternatively, network 102 may comprise the Public Switched Telephone Network (PSTN). The exact form of the data network 102 is not critical; instead, the data network 102 must simply be able to support full-duplex, real-time communication, at a rate which the user would find acceptable in a PC remote-control product (e.g. 9600 baud).

Communications devices 101 include a processing engine 104, a storage device 106, an output device 108, and respond to voice and other inputs 110. Communications device 101 also includes the necessary hardware and software to transmit data to and receive data from network 102. Such hardware and software can include, for example, a modem and associated device drivers. The processing engine 104 preferably takes the form of a conventional digital computer programmed to perform the functions described herein. The storage device 106 preferably takes a conventional form that provides capacity and data transfer rates to allow processing engine 104 to store and retrieve data at a rate sufficient to support real-time two-way voice communication. The output device(s) 108 can include a plurality of types of output devices including visual display screens, and audio devices such as speakers. Voice and other inputs 110 are entered by way of conventional input devices, such as microphones for voice inputs, and keyboards and pointing devices for entry of text, graphical data, and commands.

The communications devices 101 operate generally by accepting voice inputs 110 from a user and generating, in response thereto, a speech sample 112, which contains symbols indicative of the user's speech. The speech sample 112 preferably contains a plurality of symbols indicative of the entire range of sounds necessary in order to generate, from the user's voice inputs during a phone conversation, a stream of symbols that can be decoded by a receiving device (such as a communication station 101) to generate an accurate reproduction of the users voice inputs. For example, the speech sample 112 can include all letters of the alphabet, numbers from 0 through 9, and the names of days, weeks and months of the year. In addition, speech sample 112 can include additional symbols such as certain words that may be stored with different inflections and additional words, terms, or phrases that may be particularly unique to a particular user.

To converse, the user speaks into an audio input device, and processing engine 104 converts the voice inputs 110 to a stream of symbols that are transmitted to another communications device across network 102. The stream of symbols that are transmitted comprise far less data than a conventional digitized stream of a user's voice. Therefore, a two-way voice conversation can be conducted using significantly fewer network resources than required for a conventional two-way conversation conducted by transmission of digitized voice streams. Communications devices 101 operating in accordance with the principles of the present invention therefore require lower performance networks. Alternatively, in higher performance networks, communications devices 101 allow other network functions to occur concurrently. For example, other data may be transmitted on the network 102 while one or more voice conversations are being conducted. The lower bandwidth utilization of communications devices 101 also allows other data to be transmitted during the two-way conversation. For example, the decreased network utilization may allow the transmission of other data in support of the conversation, such as video data or other types of data used in certain application programs, such as spreadsheets, word processing data programs, or databases.

As previously noted, the processing engine 104 preferably takes the form of a conventional digital computer, such as a personal computer that executes programs stored on a computer-readable storage medium to perform the functions described. The functions described herein however need not be implemented in software. The functions described herein may also be implemented in either software, hardware, firmware, or a combination thereof. The flow charts shown in FIGS. 2, 3, 4, 5 and 6 illustrate operation of a preferred embodiment of communications devices 101.

Figure 2:
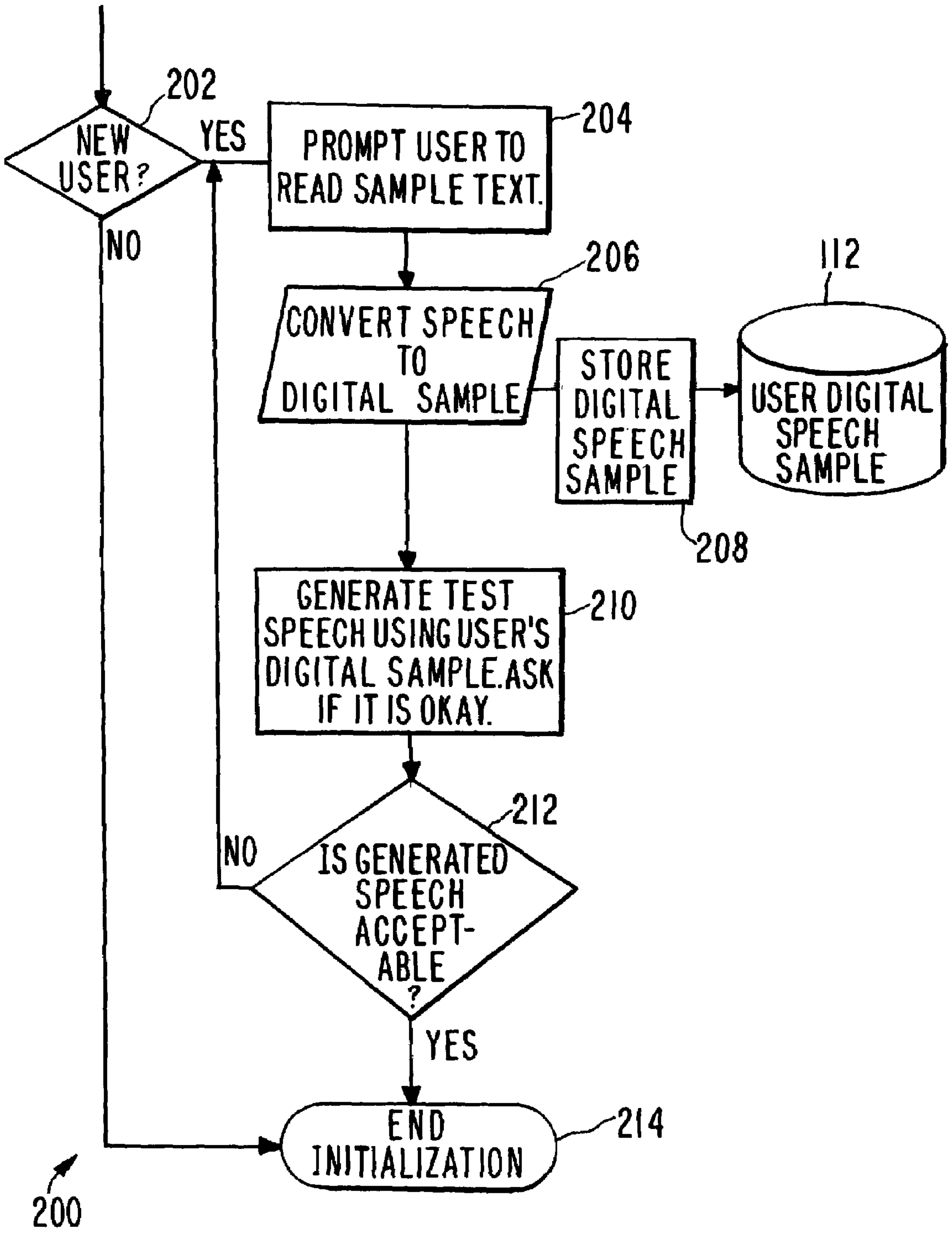
FIGS. 2, 3, 4, 5 and 6 are flowcharts illustrating operation of a preferred embodiment.

FIG. 2 illustrates an initialization routine 200 performed by processing engine 104 to generate speech sample 112. Initialization routine 200 is started by determining at step 202 if the user is a new user. If the user is not new, meaning that a speech sample 112 for that user already exists, then the routine is terminated at step 214. If the user is new, meaning that there is no speech sample 112 for the particular user, then in step 204 the user is prompted to read sample text. For example, in step 204, sample text may be displayed on an output device 108. The sample text is representative of commonly spoken sounds such as letters of the alphabet, integers from zero through nine, days of the week, and months of the year. These sounds are merely illustrative and other sounds can also be entered. For example, peculiarities of a user's speech or accent can be accounted for by having the user read certain words or phrases. The user can repeat certain, or all, text in various ways, such as at fast and slow rates, to account for different speech patterns. Certain users are aware of their own speech peculiarities and can therefore enter their own sample text and read it back. However, in many cases it may be preferable to use various types of sample text that are generated by those having particular knowledge of linguistics and/or various accents and languages. For example, different speech samples can be provided for men, women, and children. Different or additional sample text can be provided for people with different accents.

Voice input from the user reading the sample text shown at step 204 is entered into the communication device 101 by way of a microphone and is converted to speech sample 112 at step 206, and then is stored at step 208 to storage device 106. At step 210, processing engine 104 generates test speech using the stored speech sample 112 and provides the test speech by way of output device 108 in the form of an audible signal. The user is then prompted to inform the communication device 101 if the outputted speech accurately reflects the sample text. If so, then at step 212 the speech sample 112 is determined to be acceptable and the routine is terminated at step 214. If the user indicates at step 212 that the generated speech is unacceptable then steps 204, 206, 210 and 212 are repeated until an adequate speech sample 112 is generated. The routine is then terminated at step 214.

Generation of symbols indicative of the user's speech at step 206 is performed by speech recognition engine that converts a digitized signal indicative of a user's voice into text or other type of symbols such as phonemes, which are fundamental notations for sounds of speech. More specifically, phonemes are commonly described as abstract units of the phonetic system of a language that correspond to a set of similar speech sounds which are perceived to be a single distinctive sound in the language. Speech recognition engines are commercially available. For example, the ViaVoice product from IBM has a speech recognition engine that takes speech input and generates text indicative of the speech. A developers kit for this engine is also available from IBM. This kit allows the speech recognition engine of the type in the ViaVoice product to be used to generate text, phonemes or other types of output indicative of the user's speech. Such an engine also has the capability to convert speech to text or a similar representation. Such an engine can also produce realistic sounding speech by connecting synthesized or prerecorded phonemes.

Once the speech sample 112 has been stored, a call can be made using communication device 101 to perform voice communication in accordance with the principles of the present invention. A call is originated in accordance with the steps shown in FIG. 3, which shows an originate call routine 300. At step 302, the user identifies the party to be called by selecting a recipient of the call from a list provided by communications device 101, or by entering data such as a telephone number or network address for the recipient. At step 304, communications device 101.1 establishes communications with the recipient, such as communications device 101.2, shown in FIG. 1. At step 304, configuration information and user preference information are exchanged between the two communications devices 101. An example of the configuration information or user preference information is information indicating whether or not video conferencing or other services are required. Further examples are rate of speech generation and optional display of speech as text. The communications link established between the communications devices 101 can be shared for other purposes such as video conferencing or remote control. At step 306, a choice is provided to the user as to whether the recipient's speech is to be rendered via simulated voice generation in accordance with the principles of the present invention, or rendered using generic speech generation. If generic speech generation is selected then, at step 310, conversation between the calling party and receiving party is performed. Otherwise, at step 308, a test is performed to determine if communications device 101.1 has a current copy of the recipient's speech sample file 112.2. If so, then two-way voice communications are initiated at step 310. Otherwise, at step 312 communications device 101.2 transmits the speech sample file 112.2 to communications device 101.1 and conversation is performed at step 310 until the call is terminated at step 314.

A similar sequence of functions is performed by receiving station 101.2, in response to origination of a call by station 101.1. Steps 402, 404, 406, 408, 410, 412 and 414 correspond to steps 302, 304, 306, 308, 310, 312 and 314, respectively, of FIG. 3. At step 402, communications device 101.2 responds to a phone ring or network connection request initiated by device 101.1. At step 404, device 101.2 establishes communications with the originating device 101.1 and exchanges configuration and preference information at step 406. The recipient at device 101.2 is given an option of conducting the conversation by way of generic speech generation or in accordance with the principles of the present invention from speech samples 112. At step 408, determination is made if the device 101.2 contains a current copy of the speech sample 112.1 of the user of device 101.1. If so then conversation is performed in step 410. Otherwise, at step 412, the speech sample 112.1 is transmitted to the communications device 101.2 for use in the conversation. The conversation is performed at step 410 and then is subsequently terminated at 414.

Figure 3:
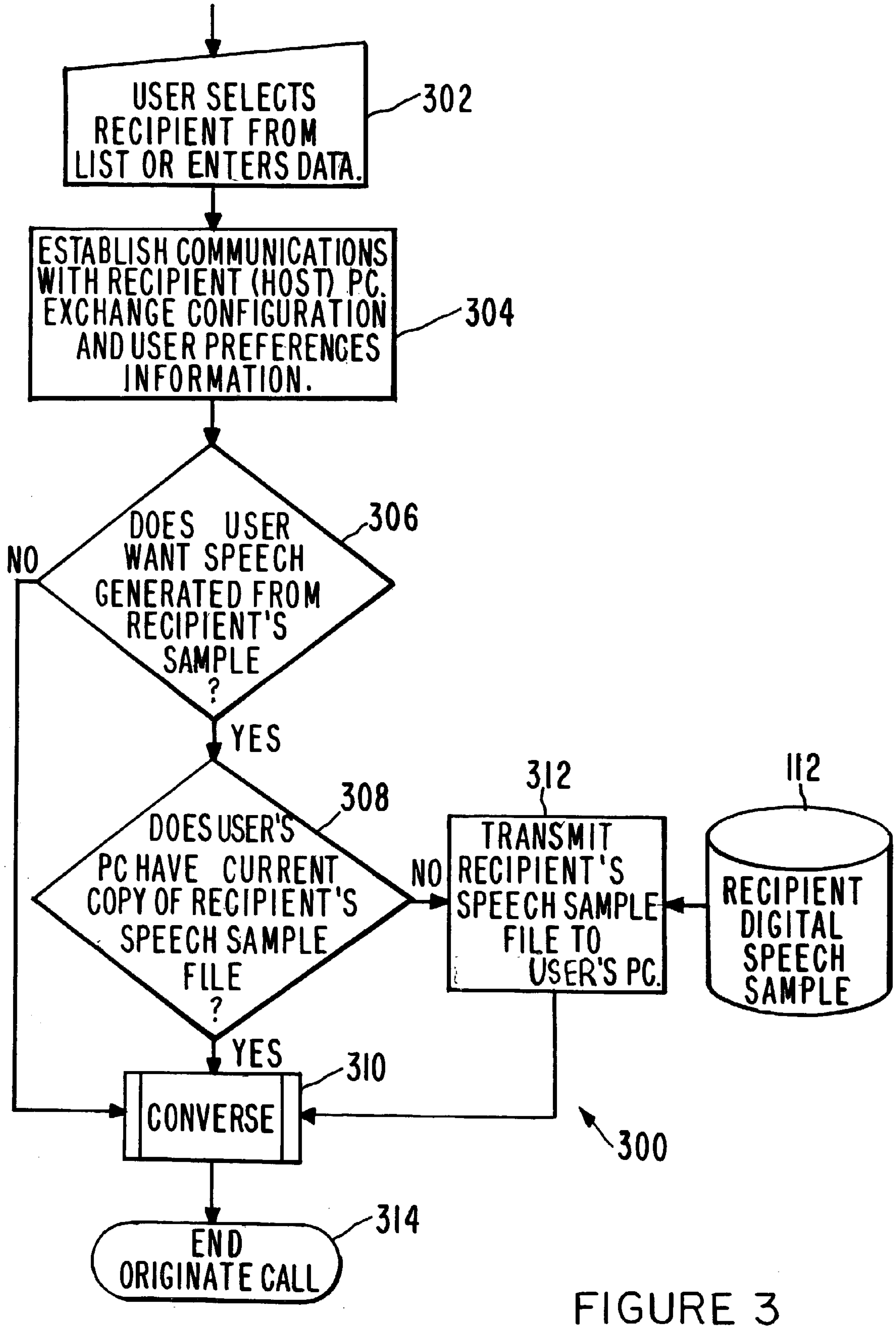
Figure 4:
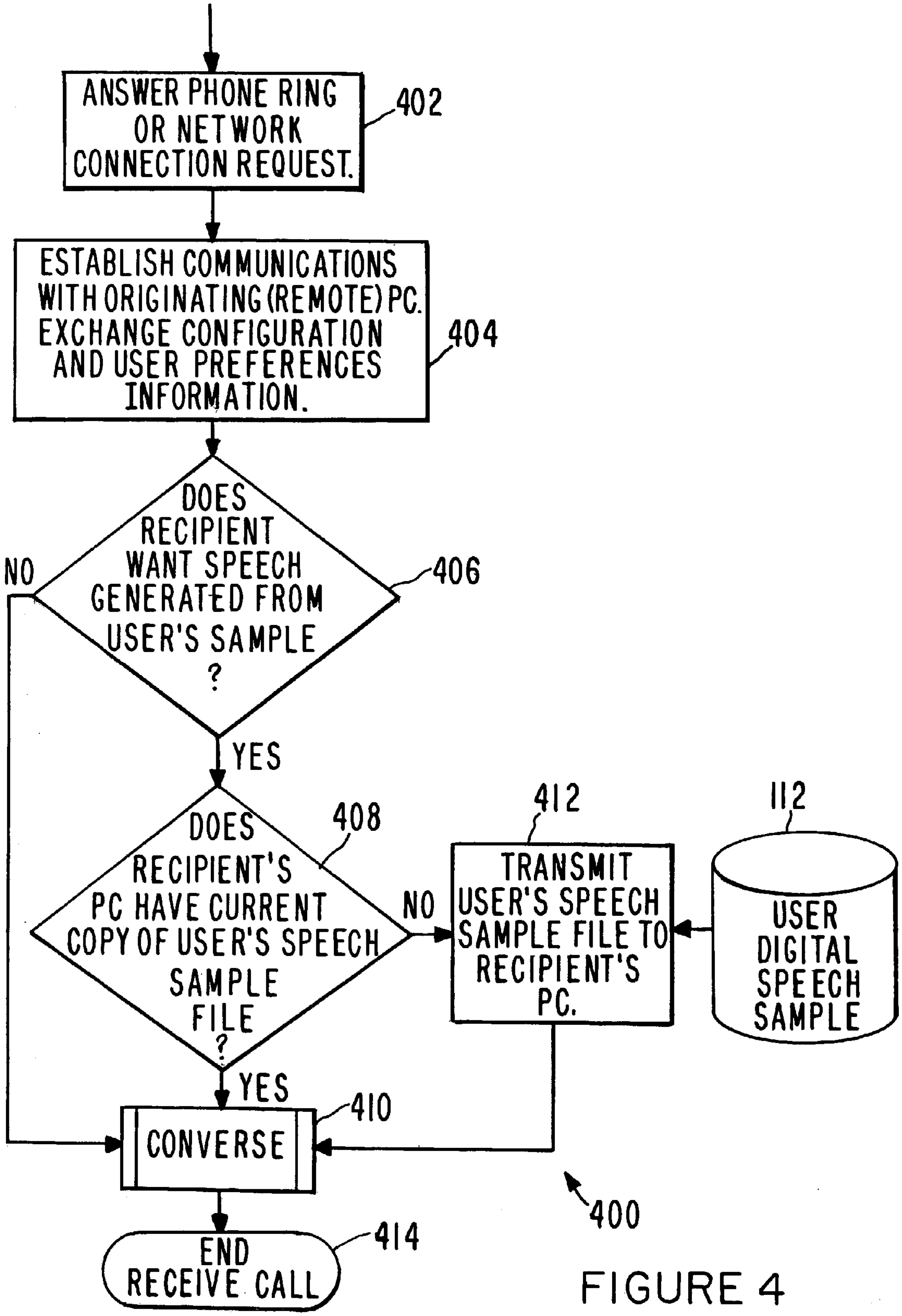
Figure 5:
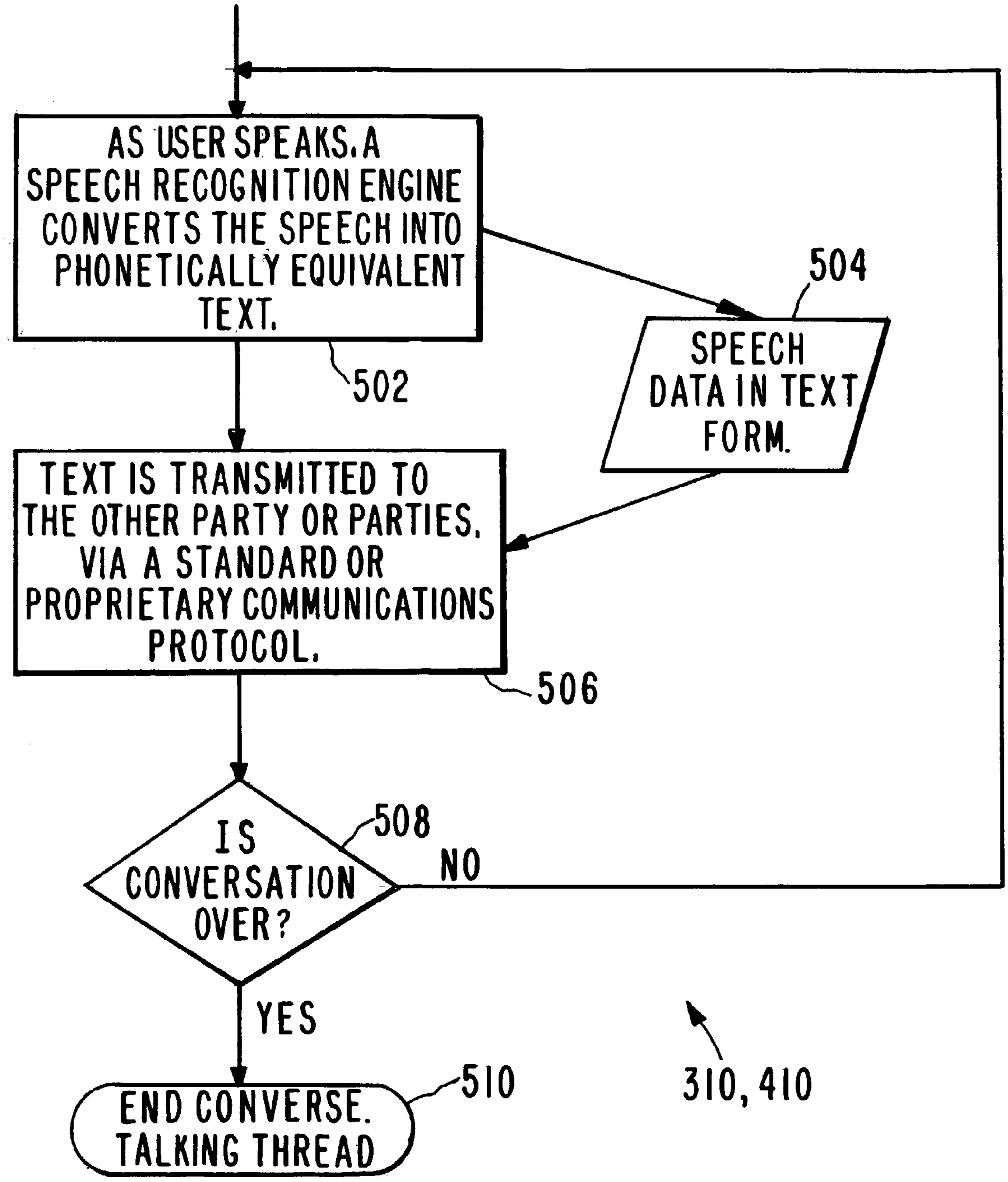

FIG. 5 shows further details of steps 310 and 410 in FIGS. 3 and 4. At step 502, each processing engine 104.1 and 104.2 converts the received speech from the user of the corresponding communications device into phonetically equivalent text in accordance with the appropriate speech sample 112. Steps 502, 504 and 506 are repeated until the conversation is determined to be over at step 508, at which point the step 310 or 410 is terminated at step 510.

Figure 6:
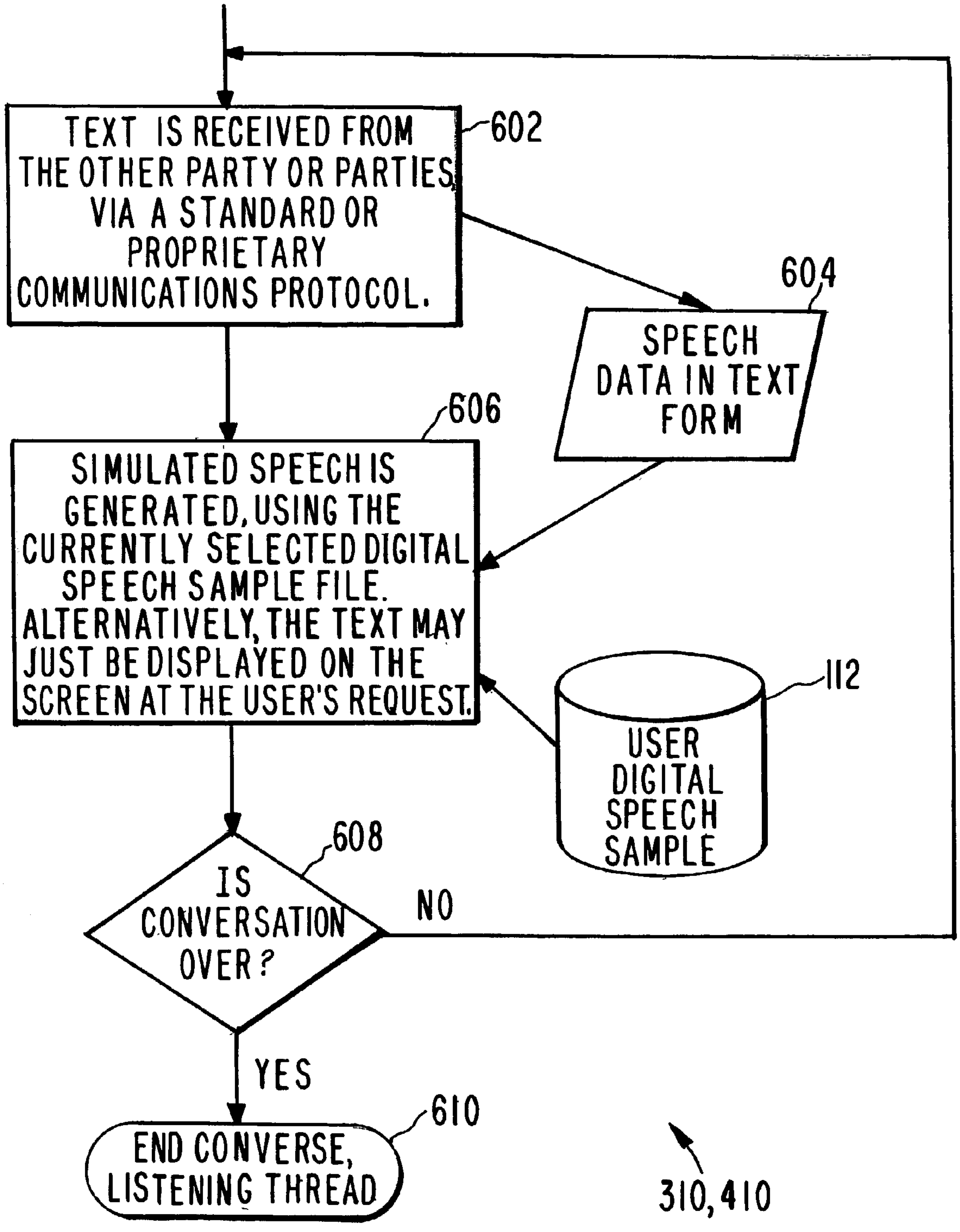

Each communications device also executes a listening routine shown in FIG. 6 in addition to the talking routine shown in FIG. 5. At step 602, the symbols transmitted by the transmitting communications device are received and converted at step 606 into simulated speech using the appropriate speech sample file 112. Alternatively, the symbols received can be converted into text for visual display. Steps 602, 604, and 606 are repeated until a determination is made at step 608 that the conversation is over. The listening routine is then terminated at step 610.

It is to be understood that the specific methods, apparati, and computer readable media that have been described herein are merely illustrative of one application of the principles of the invention, and numerous modifications may be made to the subject matter disclosed without departing from the true spirit and scope of the invention.

What is claimed is:

1. Apparatus comprising:

a processing engine responsive to a user's voice input for generating digitized speech sample data indicative of predetermined portions of said user's voice; and a storage device, coupled to said processing engine, for storing said digitized speech sample data;

said processing engine adapted to generate transmission data indicative of said user's voice spoken during a communication session as a function of said stored speech sample data, and further adapted to cause transmission of said speech sample data and said transmission data to a recipient of said communication session, wherein the recipient is programmed to recreate the user's voice spoken during the communication session using the transmission data and as a function of the speech sample data;

wherein said transmission data comprises less data than a mere digitization of said user's voice spoken during said communication session.

2. Apparatus as set forth in claim 1 wherein said processing engine encrypts said transmission data prior to transmission to said recipient.

3. Apparatus as set forth in claim 1 wherein said speech sample data comprises a plurality of alphabetic letters.

4. Apparatus as set forth in claim 1 wherein said speech sample data comprises a plurality of single digit integers.

5. Apparatus as set forth in claim 1 wherein said speech sample data comprises a plurality of phonemes.

6. Apparatus as set forth in claim 1 wherein said speech sample data comprises calendar days and months.

7. Apparatus as set forth in claim 1 wherein said processing engine transmits said speech sample data to said recipient prior to transmission of said transmission data.

8. Apparatus as set forth in claim 1 wherein:

said processing engine comprises means for transmitting ancillary information to said recipient simultaneously with said transmission data, said ancillary information comprising at least one of video data, a spreadsheet, a word processing program, and a database.

9. A method for transmitting voice data, said method comprising:

generating, at a processing engine, speech sample data indicative of a sample of a user's voice in response to voice inputs from said user;

responding to a request for a communication session by generating digital voice transmission data as a function of said user's voice spoken during said communication session and further as a function of said speech sample data; and causing transmission of said digital voice transmission data to a receiving station designated in said communication session, the receiving station having received the generated speech sample data, wherein the receiving station is configured to recreate the user's voice using the transmission data and as a function of the speech sample data;

wherein said digital voice transmission data comprises less data than a mere digitization of said user's voice spoken during said communication session.

10. A method as set forth in claim 9 comprising the further step of encrypting said voice transmission data prior to transmission.

11. A method as set forth in claim 9 wherein said voice transmission data is converted by said receiving station to audible sounds indicative of said user's spoken voice.

12. A method as set forth in claim 9 wherein said voice transmission data is converted by said receiving station to a visual representation indicative of said user's spoken voice.

13. A method as set forth in claim 9 wherein speech sample data is also transmitted to said receiving station and wherein said voice transmission data is converted by said receiving station to an audible representation of said user's voice spoken during said communication session as a function of said speech sample data.

14. A method as set forth in claim 9 wherein said speech sample data comprises a plurality of alphabetic letters.

15. A method as set forth in claim 9 wherein said speech sample data comprises a plurality of single digit integers.

16. A method as set forth in claim 9 wherein said speech sample data comprises phonemes.

17. A method as set forth in claim 9 wherein said speech sample data comprises calendar days and months.

18. A method as set forth in claim 9 wherein said communication session comprises transmission of said sample speech data to said recipient.

19. A method as set forth in claim 9 comprising the further step of said user receiving, from said receiving station, voice data in the form of signals corresponding to a spoken voice of an operator of said receiving station.

20. A method as set forth in claim 9 comprising the further step of said user receiving, from said receiving station, voice transmission data indicative of words spoken by an operator of said receiving station and generating, as a function of speech sample data indicative of a sample of voice characteristics of said operator of said receiving station, audible sounds indicative of said words spoken by said operator of said receiving station.

21. A method as set forth in claim 9 comprising the further step of said user receiving, from said receiving station, voice transmission data indicative of words spoken by an operator of said receiving station and generating a visual representation of said words spoken by said operator of said receiving station.

22. A method as set forth in claim 9 wherein, simultaneously with the transmission of the digital voice transmission data to the receiving station, ancillary information is transmitted to the receiving station, said ancillary information comprising at least one of video data, a spreadsheet, a word processing program, and a database.

23. A computer-readable storage medium containing a set of computer executable programming instructions stored thereon for causing two-way voice communication over a shared communications medium, the set of computer programming instructions comprising:

a voice sampling module for generating speech sample data as a function of a user's spoken voice; and a voice conversion module, responsive to establishment of a communication session between said user and a second party, for converting said user's spoken voice, as a function of said speech sample data, to voice transmission data, and for causing transmission of said speech sample data and said voice transmission data to said second party via said shared communications medium to enable recreation by the second party of the user's spoken voice;

wherein said voice transmission data contains less data than a mere digitization of said user's spoken voice.

24. A computer-readable storage medium as set forth in claim 23 wherein said voice sampling module comprises means for causing said speech sample data to be converted to audible outputs for review by said user prior to transmission to the second party.

25. A computer-readable storage medium as set forth in claim 23 wherein the set of computer programming instructions further comprises a transmission module for transmitting ancillary information to said second party simultaneously with the transmission of said voice transmission data to said second party, said ancillary information comprising at least one of video data, a spreadsheet, a word processing program, and a database.

26. An apparatus for recreating a user's voice during a communication session, the apparatus comprising:

a memory storing digitized speech sample data indicative of predetermined portions of the user's voice;

an interface for receiving from a transmitting system transmission data indicative of the user's voice spoken during the communication session as a function of the stored speech sample data, wherein the transmission data comprises less data than a mere digitization of the user's voice spoken during the communication session; and a processing engine programmed to recreate the user's voice spoken during the communication session using the transmission data and as a function of the speech sample data.

27. A method for recreating a user's voice during a communication session, the method comprising:

storing, in a storage device, speech sample data indicative of a sample of a user's voice based on voice inputs from the user;

during a communication session, receiving digital voice transmission data as a function of said user's voice spoken during the communication session and further as a function of the speech sample data, wherein the digital voice transmission data comprises less data than a mere digitization of the user's voice spoken during the communication session; and recreating the user's voice spoken during the communication session using the digital voice transmission data and as a function of the speech sample data.

* * * * *

UNITED STATES PATENT AND TRADEMARK OFFICE

CERTIFICATE OF CORRECTION

PATENT NO. : 7,593,387 B2
APPLICATION NO. : 10/215835
DATED : September 22, 2009
INVENTOR(S) : Leviton et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1588 days.

Signed and Sealed this

Twenty-first Day of September, 2010

David J. Kappos

*Director of the United States Patent and Trademark Office*